United States Patent
Chennamsetty et al.

(10) Patent No.: US 10,811,985 B2
(45) Date of Patent: Oct. 20, 2020

(54) POWER CONVERSION SYSTEM AND AN ASSOCIATED METHOD THEREOF

(71) Applicant: GENERAL ELECTRIC COMPANY, Schenectady, NY (US)

(72) Inventors: Prashanth Manikumar Chennamsetty, Karnataka (IN); Rien William O'Steen, Newberry, FL (US); Pradeep Vijayan, Karnataka (IN); Arvind Kumar Tiwari, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/327,493

(22) PCT Filed: Aug. 8, 2017

(86) PCT No.: PCT/US2017/045905
§ 371 (c)(1),
(2) Date: Feb. 22, 2019

(87) PCT Pub. No.: WO2018/038911
PCT Pub. Date: Mar. 1, 2018

(65) Prior Publication Data
US 2019/0181768 A1 Jun. 13, 2019

(30) Foreign Application Priority Data
Aug. 26, 2016 (IN) .............................. 201641029124

(51) Int. Cl.
*H02M 3/335* (2006.01)
*H02M 1/08* (2006.01)
(Continued)

(52) U.S. Cl.
CPC ......... *H02M 3/33592* (2013.01); *H02M 1/08* (2013.01); *H02M 2001/0009* (2013.01);
(Continued)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 5,023,542 A   6/1991 Banura
5,875,414 A   2/1999 Tsutsuni
(Continued)

FOREIGN PATENT DOCUMENTS

CN   1052822 C    5/2000
CN   101142737 A  3/2008
(Continued)

OTHER PUBLICATIONS

Indian First Examination Report issued in related Indian patent application No. 201641029124, dated Mar. 20, 2019.
(Continued)

*Primary Examiner* — Bryan R Perez
(74) *Attorney, Agent, or Firm* — McGarry Bair PC

(57) ABSTRACT

A system including a converter is disclosed. The converter includes a first switch having one or more first controllable switches coupled in parallel across at least one diode. A first controlling unit is operatively coupled to the converter. The first controlling unit is configured to determine a temperature of the one or more first controllable switches. The first controlling unit is further configured to compare the determined temperature of the one or more first controllable switches with a transition temperature at which a first power loss of the one or more first controllable switches is equal to a second power loss of the at least one diode and control a switching state of the one or more first controllable switches based on the comparison of the determined temperature with the transition temperature.

16 Claims, 7 Drawing Sheets

(51) Int. Cl.
  *H02M 1/00* (2006.01)
  *H02M 1/32* (2007.01)
(52) U.S. Cl.
  CPC ............ *H02M 2001/0048* (2013.01); *H02M 2001/327* (2013.01); *Y02B 70/1475* (2013.01); *Y02B 70/1491* (2013.01)
(58) Field of Classification Search
  CPC ......... H02M 3/33507; H02M 3/33592; H02M 3/33523; H02M 3/3353; H02M 3/33569; H02M 1/12; H02M 1/42; H02M 1/4225; H02M 1/4233; H02M 1/4241; H02M 1/4258; H02M 1/425; H02M 1/4208; H02M 2001/4283; H02M 2001/4291; H02M 2003/1552; Y02B 70/1425; Y02B 70/1491
  See application file for complete search history.

(56) References Cited

U.S. PATENT DOCUMENTS

| | | |
|---|---|---|
| 6,442,051 B1 | 8/2002 | Ryan et al. |
| 7,072,194 B2 | 7/2006 | Nayar et al. |
| 7,791,300 B2 | 9/2010 | Katsuyama et al. |
| 8,027,181 B2 | 9/2011 | Hamatani |
| 8,076,699 B2 | 12/2011 | Chen et al. |
| 8,582,335 B2 | 11/2013 | Hasegawa et al. |
| 8,699,243 B2 | 4/2014 | Sims et al. |
| 8,767,424 B2 | 7/2014 | Kazama |
| 9,013,144 B2 | 4/2015 | Cooley et al. |
| 9,197,132 B2 | 11/2015 | Artusi et al. |
| 9,595,865 B2 | 3/2017 | John et al. |
| 9,985,545 B2 | 5/2018 | Fujisaki et al. |
| 2010/0328975 A1 | 12/2010 | Hibino et al. |
| 2011/0210713 A1* | 9/2011 | Kazama ............... H02M 3/1588 323/311 |
| 2012/0223590 A1 | 9/2012 | Low et al. |
| 2014/0338380 A1* | 11/2014 | Kamiya ................. F25B 40/00 62/129 |
| 2015/0207407 A1 | 7/2015 | Nishiwaki |
| 2016/0088778 A1 | 3/2016 | Geisler et al. |

FOREIGN PATENT DOCUMENTS

| | | |
|---|---|---|
| CN | 101904080 A | 12/2010 |
| CN | 102474198 A | 5/2012 |
| CN | 103516239 A | 1/2014 |
| CN | 203457062 U | 2/2014 |
| CN | 203645381 U | 6/2014 |
| CN | 104795393 A | 7/2015 |
| CN | 105359399 A | 2/2016 |
| CN | 105811771 A | 7/2016 |
| EP | 0792008 A2 | 8/1997 |
| JP | 2010017061 A | 1/2010 |
| JP | 2011166920 A | 8/2011 |
| WO | 2008007723 W | 1/2008 |
| WO | 2016125292 | 8/2016 |

OTHER PUBLICATIONS

Zhang et al., "High frequency synchronous Buck converter using GaN-on-SiC HEMTs", 2013 IEEE Energy Conversion Congress and Exposition, pp. 488-494, Sep. 15-19, 2013, Denver, CO.
Ramachandran et al., "Design of a compact, ultra high efficient isolated DC-DC converter utilizing GaN devices", IECON 2014—40th Annual Conference of the IEEE Industrial Electronics Society, pp. 4256-4261, Oct. 29-Nov. 1, 2014, Dallas, TX.
International Search Report and Written Opinion dated Nov. 14, 2017 which was issued in connection with PCT/US17/45905 which was filed on Aug. 8, 2017.
Chinese Patent Office, Office Action re Corresponding Application No. 201780066748.3, dated Jun. 22, 2020, 12 pages, China.

* cited by examiner

POWER CONVERSION SYSTEM AND AN ASSOCIATED METHOD THEREOF

BACKGROUND

Embodiments of the present invention generally relate to power conversion systems and more specifically to a power conversion system embodiment, the temperature determination technique may include determining a load current. A modulation signal or a duty cycle of the second controllable switch is determined based on the determined load current. Subsequently, the temperature of the one or more first controllable switches is determined based on the modulation signal or a duty cycle of the configured to operate over a wide range of temperatures.

Currently, different DC-DC converters and AC-DC converters incorporating synchronous rectification circuits at an output side are widely available. Typically, such converters operate at a room temperature with higher efficiency (for example, >90%). For high temperature operations, such converters may be designed by employing components which are capable of withstanding high temperature. However, the converters designed for high temperature operations are over-rated or require efficient thermal management solutions. The over-rating of the converters and the use of advanced thermal management solutions make the converter bulkier and costlier. Furthermore, life of the converters and the reliability of the converters may be compromised.

When the converters designed for high temperature are operated at higher temperatures (for example, above 85° C.), the converters tend to lose efficiency. It may be noted that several factors contribute to loss of efficiency at higher temperatures. In particular, the semiconductor devices of the converters contribute significantly to the loss of efficiency. Therefore, maintaining higher efficiency of the converters at higher temperatures and for a wide range of operating temperatures is a challenging task.

Accordingly, there is a need for a power conversion system configured to operate over a wide range of operating temperatures.

BRIEF DESCRIPTION

In accordance with one embodiment of the present invention, a system including a converter is disclosed. The converter includes a first switch having one or more first controllable switches coupled in parallel across at least one diode. A first controlling unit is operatively coupled to the converter. The first controlling unit is configured to: determine a temperature of the one or more first controllable switches. The first controlling unit is further configured to compare the determined temperature of the one or more first controllable switches with a transition temperature at which a first power loss of the one or more first controllable switches is equal to a second power loss of the at least one diode. The first controlling unit is further configured to control a switching state of the one or more first controllable switches based on the comparison of the determined temperature with the transition temperature.

In accordance with another embodiment of the present invention, a method is disclosed. The method includes determining a temperature of one or more first controllable switches of a converter. The one or more first controllable switches is coupled in parallel across at least one diode of the converter. Further, the method includes comparing the determined temperature of the one or more first controllable switches with a transition temperature at which a first power loss of the one or more first controllable switches is equal to a second power loss of the at least one diode. Further, the method includes controlling a switching state of the one or more first controllable switches based on the comparison of the determined temperature with the transition temperature.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit", "circuitry", and "controlling unit" may include either a single component or a plurality of components, which are either active and/or passive and are connected or otherwise coupled together to provide the described function. Also, the term "operatively coupled" as used herein includes wired coupling, wireless coupling, electrical coupling, magnetic coupling, radio communication, software based communication, or combinations thereof.

As will be described in detail hereinafter, various embodiments of an exemplary power conversion system and a method of operating the exemplary power conversion system are disclosed. Specifically, the power conversion system includes a converter having a plurality of switches configured to operate efficiently over a wide range of temperature. The use of such switches in the converter enables the converter to be operated over a wide range of temperature without compromising on the efficiency of the converter. The exemplary power conversion system may find application in power supply systems employed in environments prone to wide range of temperature fluctuation, such as in aircrafts, data centers, submarines, oil and gas extraction systems, and the like.

Figure 1:
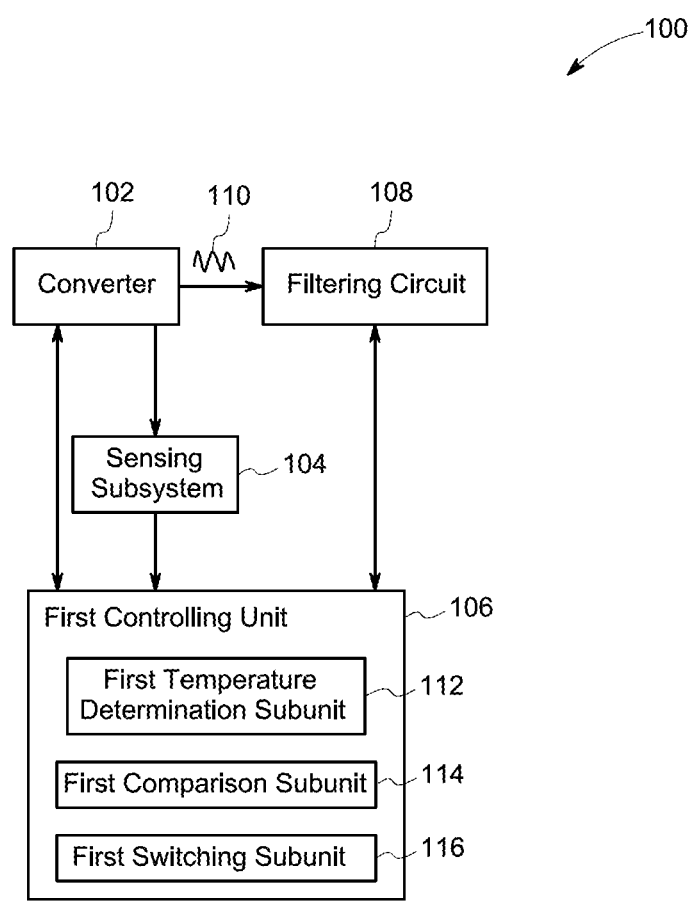
FIG. 1 is a block diagram of a power conversion system in accordance with certain embodiments of the present invention.

Turning now to the drawings and by way of example in FIG. 1, a block diagram of a power conversion system 100 in accordance with certain embodiments of the present invention is shown. The power conversion system 100 includes a converter 102, a sensing subsystem 104, a first controlling unit 106, and a filtering circuit 108. The converter 102 may include a non-isolated converter or an isolated converter. The converter 102 includes one or more first controllable switches (not shown in FIG. 1) and at least one second controllable switch (not shown in FIG. 1). Furthermore, the converter 102 is operatively coupled to the sensing subsystem 104 and the filtering circuit 108. The filtering circuit 108 is configured to filter an output signal 110 generated by the converter 102. In one embodiment, the output signal 110 may be representative of an output voltage or an output current.

In addition, the first controlling unit 106 is operatively coupled to the converter 102, the sensing subsystem 104, and the filtering circuit 108. In one embodiment, the first controlling unit 106 may be separated and disposed remotely from the power conversion system 100. In particular, the first controlling unit 106 may be disposed in a controlled temperature environment. The first controlling unit 106 includes an analog controlling unit or a digital controlling unit.

In one embodiment, the first controlling unit 106 is configured to monitor, analyze, and process parameters of the converter 102, the sensing subsystem 104, and the filtering circuit 108. The parameters of the converter 102, the sensing subsystem 104, and the filtering circuit 108 may include current, voltage, temperature, and the like.

Further, the first controlling unit 106 is configured to control operation of the converter 102. In one embodiment, the first controlling unit 106 is configured to control a switching state of the one or more first controllable switches and the at least one second controllable switch of the converter 102. The term "switching state" as used herein may be used to refer to activation or deactivation of the first and second controllable switches. The term 'activation' of the switch, as used herein, refers to transitioning the switch to an 'ON' state to provide a closed circuit or electrically conducting path. The term 'deactivation' of the switch, as used herein, refers to transitioning the switch to an 'OFF' state to provide an open circuit or electrically non-conducting path.

The first controlling unit 106 may include one or more processing units and associated memory devices configured to execute at least one control algorithm. As used herein, the term "processing unit" refers not only to integrated circuits included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits.

Furthermore, the first controlling unit 106 may be operatively coupled to a data repository (not shown in FIG. 1). The data repository includes a memory device. Further, the memory device(s) may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements. The exemplary power conversion system 100 may be used in applications such as in power supply systems for aviation, submarines, and the like.

In the illustrated embodiment, the first controlling unit 106 includes a first temperature determination subunit 112, a first comparison subunit 114, and a first switching subunit 116. The first temperature determination subunit 112 is configured to determine a temperature corresponding to the one or more first controllable switches, using one or more temperature determination techniques. The first comparison subunit 114 is configured to compare the determined temperature with a transition temperature discussed in greater detail below. The first switching subunit 116 is configured to control a switching state of the one or more first controllable switches based on the comparison.

Figure 2:
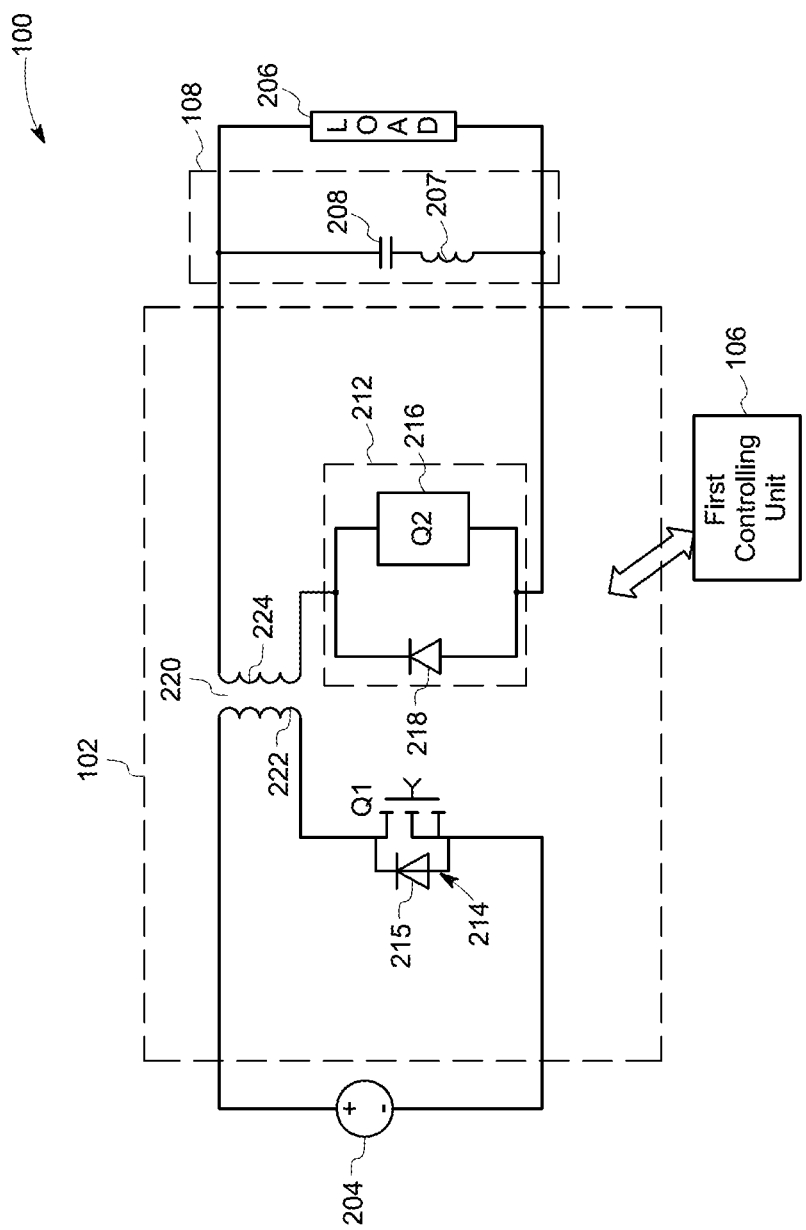
FIG. 2 is a diagrammatical representation of a power conversion system in accordance with the embodiment of FIG. 1.

Referring to FIG. 2, a diagrammatical representation of the power conversion system 100 in accordance with certain embodiments of the present invention is disclosed. In the illustrated embodiment, the converter 102 is a fly-back converter equipped with synchronous rectification. The converter 102 is coupled to a source 204 and a load 206. In one embodiment, the source 204 is a direct current (DC) voltage source or an alternating current (AC) rectified voltage source. The converter 102 is coupled to the load 206 via a filtering circuit 108. The filtering circuit 108 includes a filter capacitor 208 and an inductor 207. In one embodiment, the filtering circuit 108 includes either the inductor 207 or the capacitor 208. Although in the illustrated embodiment, the converter 102 is a fly-back converter, in other embodiments, the converter 102 may be an inductor-inductor-capacitor (LLC) converter, a buck converter, a boost converter, a series resonant converter, a parallel resonant converter is also envisaged.

The converter 102 includes a first switch 212 and a second switch 214. The first switch 212 includes one or more first controllable switches 216 and at least one diode 218. For the ease of illustration, only one first controllable switch 216 and one diode 218 are shown. The diode 218 is coupled in parallel to the first controllable switch 216. The diode 218 is an additional diode and is not a freewheeling body diode of the first controllable switch 216. In the illustrated embodiment the first controllable switch 216 is a wide-band gap device. The wide-band gap device is a high electron mobility transistor (HEMT) such as a gallium nitride (GaN) based switch. In another embodiment, the wide-band gap device includes a silicon carbide (SiC) based switch. In yet another embodiment, the first controllable switch 216 includes a silicon based switch such as an insulated gate bipolar transistor, a metal oxide semiconductor field effect transistor, a field-effect transistor, an injection enhanced gate transistor, an integrated gate commutated thyristor, or combinations thereof. In one embodiment, the first controllable switch 216 includes a freewheeling body diode (not shown in FIG. 2). The second switch 214 includes at least one second controllable switch. Reference numeral 214 is used for referring to the second switch or the second controllable switch in the subsequent detailed description. For ease of illustration, only one second controllable switch is shown.

In the illustrated embodiment, the first switch 212 is configured to operate as a synchronous rectifier of the converter 102. The second controllable switch 214 includes a freewheeling body diode 215. The first controlling unit 106 is configured to control operation of the converter 102. Specifically, the first controlling unit 106 is configured to control activation and/or deactivation of the first and second controllable switches 216, 214. More specifically, the switching subunit 116 of the first controlling unit 106 is configured to control activation and/or deactivation of the first and second controllable switches 216, 214. In certain embodiments, a plurality of first controllable switches 216 may be operatively coupled in parallel to each other.

In one embodiment, the converter 102 further includes an isolation transformer 220. The isolation transformer 220 includes a primary side 222 and a secondary side 224. The first switch 212 is coupled to the secondary side 224 of the isolation transformer 220.

The use of the first switch 212 enables to operate the power conversion system 100 over a wide range of temperature. In one embodiment, the power conversion system 100 is configured to operate at temperature a range of about −55 degrees centigrade to about +125 degrees centigrade.

Figure 3:
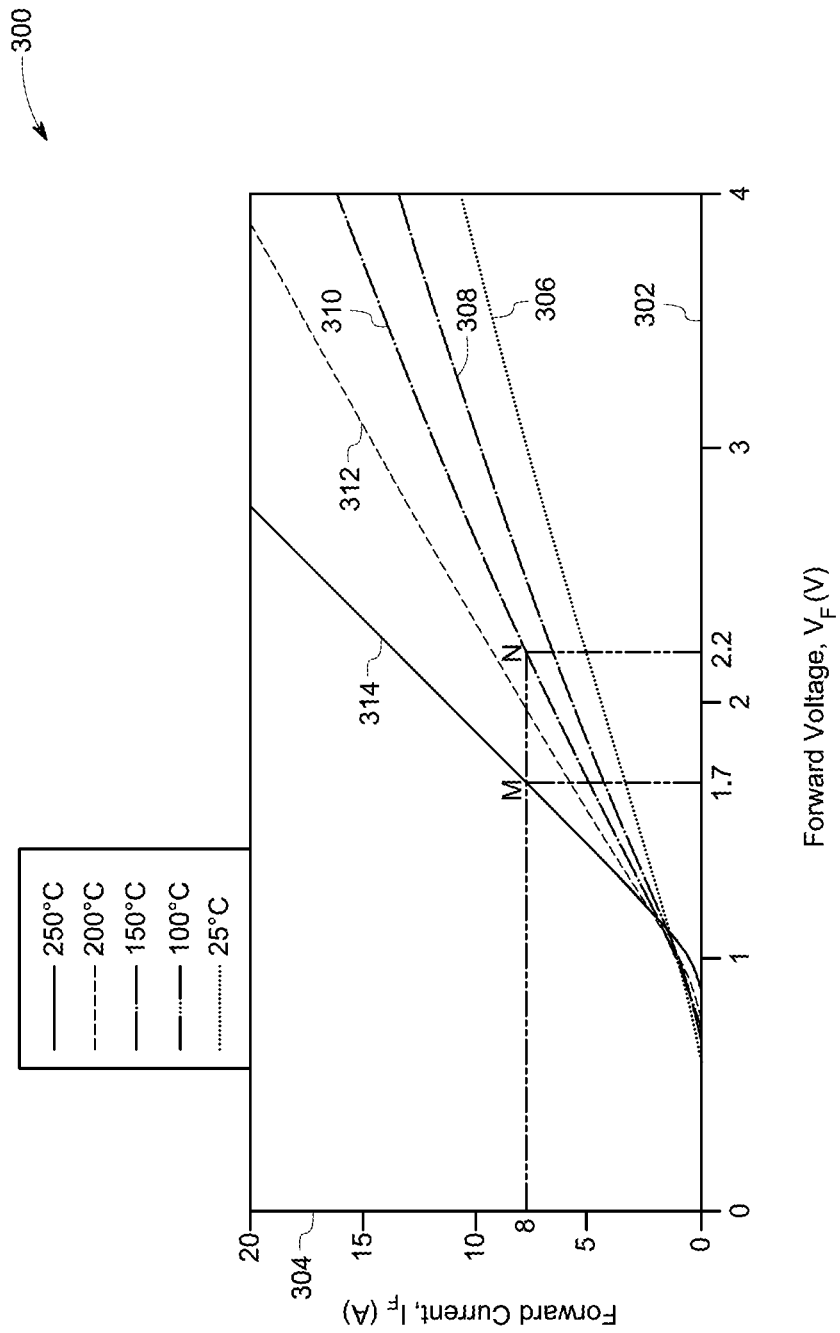
FIG. 3 is a graphical representation of variation of a forward voltage drop with reference to operating temperature of a diode in accordance with the embodiment of FIG. 2.

Referring now to FIG. 3, a graphical representation 300 of a characteristic of a forward voltage drop of the diode 218 of FIG. 2 with reference to temperature is shown. An x-axis 302 is representative of forward voltage drop in volts. Further, y-axis 304 is representative of forward current in amperes. Further, curves 306, 308, 310, 312, and 314 are representative of forward voltage-forward current characteristics for operating temperatures of about 25 degrees centigrade, 100 degrees centigrade, 150 degrees centigrade, 200 degrees centigrade, and 250 degrees centigrade respectively.

In one embodiment, when the forward current is 8 amperes, the forward voltage drop at an operating temperature of 250 degrees centigrade is 1.7 volts. Further, when the forward current is 8 amperes, the forward voltage drop at an operating temperature of 150 degrees centigrade is 2.2 volts.

It may be noted herein that since the diode has a forward-voltage drop, there is always an associated power loss in the diode. For a predefined forward current, the forward voltage drop of the diode decreases when the operating temperature increases. The power loss in the diode is proportional to the voltage. The power loss decreases when operating temperature increases since the forward voltage drop of the diode decreases when the operating temperature increases. Therefore, the diode may be advantageously operated at higher temperatures without increasing power loss.

Figure 4:
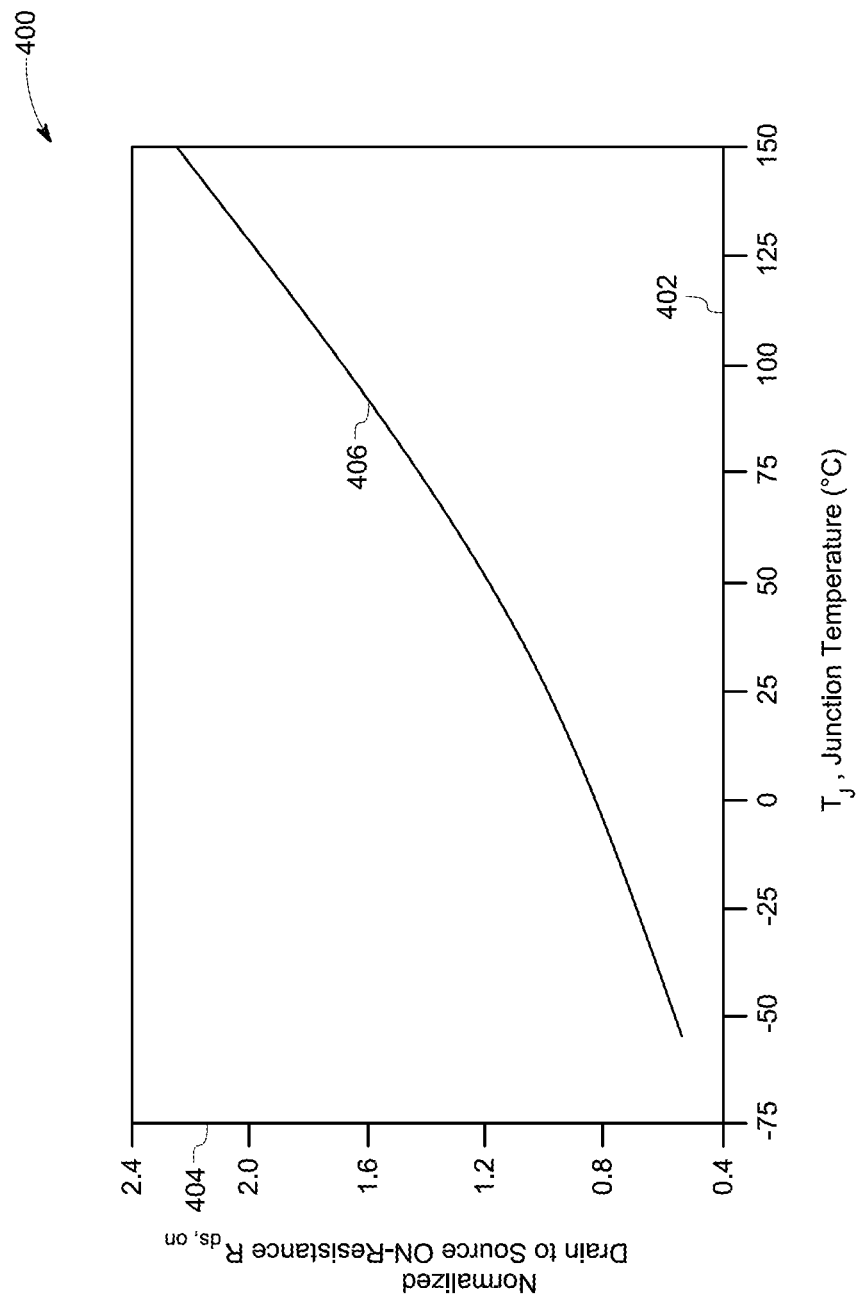
FIG. 4 is a graphical representation of variation of ON state resistance ($R_{ds,on}$) with reference to operating temperature of a first controllable switch in accordance with the embodiment of FIG. 2.

Referring now to FIG. 4, a graphical representation 400 of variation of ON state resistance ($R_{ds,on}$) with reference to variation in temperature of the first controllable switch 216 of FIG. 2, for example is shown. An x-axis 402 is representative of a junction temperature of the first controllable switch in degrees centigrade. A y-axis 404 is representative of a normalized ON state drain to source resistance of the first controllable switch. The term 'normalized ON state drain to source resistance' refers to a normalized resistance with respect to a predefined temperature It may be noted herein that the power losses in the first controllable switch is due to the ON state drain to source resistance ($R_{ds,on}$). Curve 406 is representative of a variation of the ON state drain to source resistance $R_{ds,on}$ with reference to operating temperature of the first controllable switch. It may be noted herein that for a predefined current of the first controllable switch, the ON state drain to source resistance $R_{ds,on}$ increases when the temperature increases. Power loss is proportional to ON state drain to source resistance $R_{ds,on}$. Hence, when the operating temperature increases, the power loss in the first controllable switch increases. When the operating temperature increases, the power loss in any wide-band gap device also increases.

Figure 5:
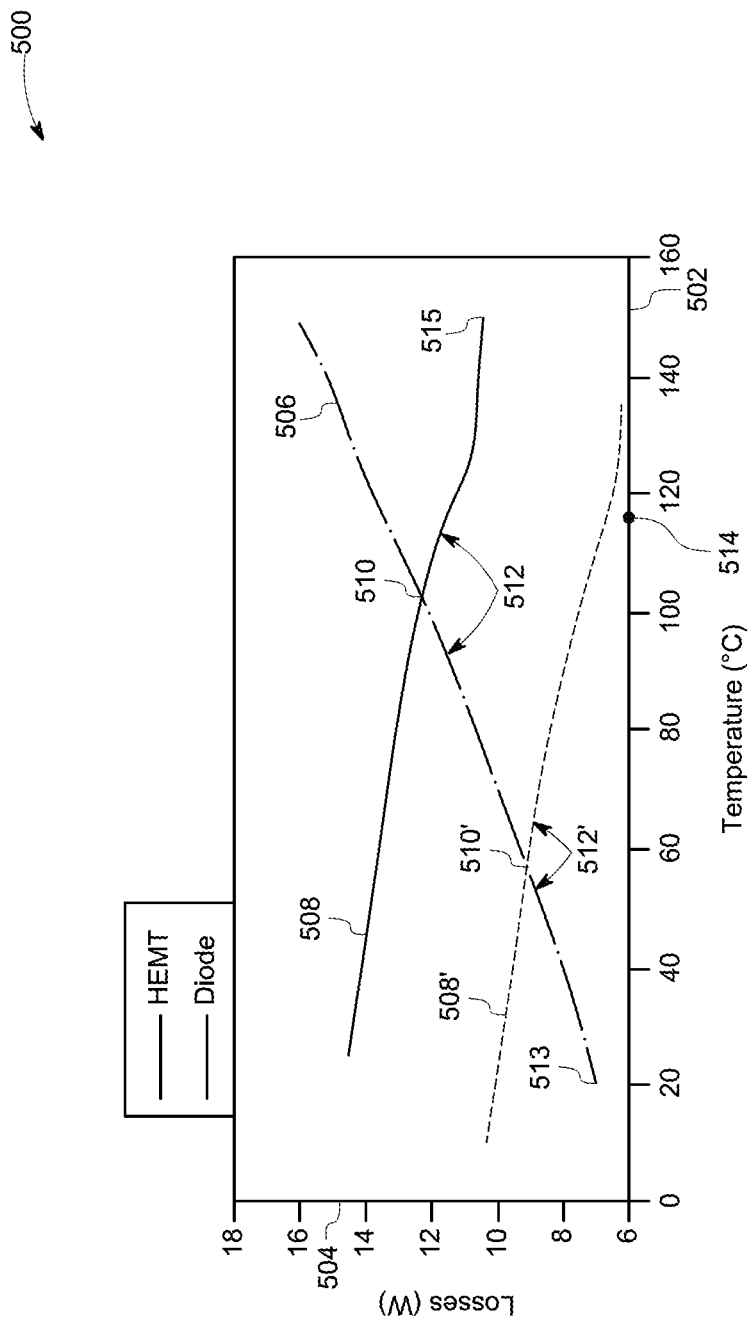
FIG. 5 is a graphical representation of a power loss characteristics of a first switch of a converter in accordance with the embodiment of FIG. 1.

Referring now to FIG. 5, a graphical representation 500 of a power loss characteristic of the first switch 212 of the converter 102 of FIG. 2, for example, is shown. An x-axis 502 is representative of an operating temperature in degrees centigrade and a y-axis 504 is representative of power loss in Watts.

Further, curve 506 is representative of power loss characteristics of the first controllable switch and curve 508 is representative of power loss characteristics of the diode 218 shown in FIG. 2, for example. An intersecting point 510 of the curves 506, 508 is representative of a transition temperature. The power loss of the first controllable switch may be referred to as the first power loss and the power loss of the diode may be referred to as the second power loss. At the transition temperature, the first power loss is equal to the second power loss. Reference numeral 512 is representative of a curve along which the power loss of the first switch is minimal over a wide range of operating temperature. The curve 512 is a combination of portions of the curve 506 and the curve 508. In the illustrated embodiment, the curve 512 is a combination of a portion of the curve 506 between points 513 and 510 and a portion of the curve 508 between points 510 and 515. Further, reference numeral 514 is representative of higher limit of the operating temperature of the first controllable switch.

Further, curve 508' is representative of power loss characteristics in accordance with another embodiment of diode 218. An intersecting point 510' of the curves 506, 508' is representative of a transition temperature. Reference numeral 512' is representative of a curve along which the power loss of the first switch 212 is minimal over a wide range of operating temperatures.

Referring again back to FIG. 2 in combination with FIG. 5, if the first controllable switch 216 has a freewheeling body diode, the diode 218 is selected in such a way that the forward voltage drop of the diode 218 is substantially less than the forward voltage drop of the freewheeling body diode of the first controllable switch 216. In one embodiment, difference between the forward voltage drop of the freewheeling body diode of the first controllable switch 216 and the forward voltage drop of the diode 218 may be greater than or equal to 0.2 volts. In another embodiment, the power loss of the diode 218 is equal to the power loss of the first controllable switch 216 at a temperature less than higher limit of the operating temperature 514 (shown in FIG. 5) of the first controllable switch 216.

In yet another embodiment, the transition temperature at the point 510' is substantially less than the transition temperature at the point 510. Further, power loss of the first switch 212 represented by the curve 512' is substantially less than the power loss of the first switch 212 represented by the curve 512 beyond the transition temperature 510'. In such an embodiment, the cost of the diode 218 increases substantially. For an optimum design, there needs to be a tradeoff between the power losses of the first switch 212 and the cost of the diode 218.

The diode 218 provides a conducting path for the flow of current when the operating temperature is greater than the transition temperature 510. The first controllable switch 216 is activated at an operating temperature less than the transition temperature 510 for providing a conducting path for the flow of current. When the first controllable switch 216 is activated, the diode 218 does not provide a conducting path for the flow of current. As a result, power loss in the converter 102 is reduced over a wide range of operating temperatures. In particular, the power loss may be restricted along the curve 512 shown in FIG. 5, for example. Thus, the converter 102 is operated over a wide range of operating temperatures without compromising on the efficiency.

Figure 6:
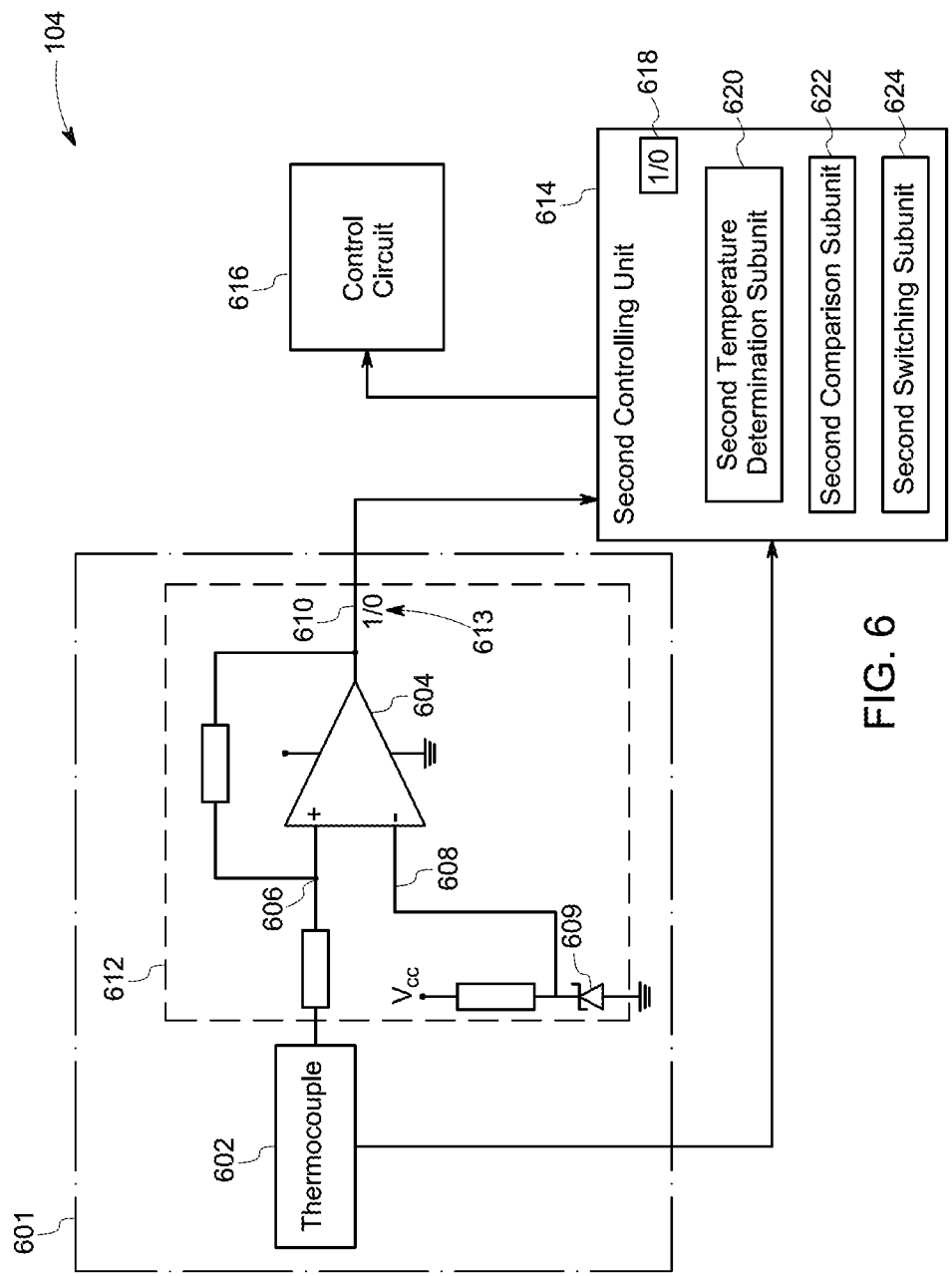
FIG. 6 is a diagrammatical representation of a sensing subsystem in accordance with the embodiment of FIG. 1.

FIG. 6 is a diagrammatical representation of the sensing subsystem 104 in accordance with the embodiment of FIG. 1. The sensing subsystem 104 is operatively coupled to the converter 102. The sensing subsystem 104 includes a sensing unit 601, a second controlling unit 614, and a control circuit 616. The second controlling unit 614 includes a second temperature determination subunit 620, a second comparison subunit 622, and a second switching subunit 624. The sensing unit 601 includes a temperature sensor 602 and an analog circuit 612 used for determining switching state of the first controllable switch. The analog circuit 612 includes a comparator 604, associated resistors, and capacitors. In the illustrated embodiment, the temperature sensor 602 is a thermocouple. The numeral 602 may be used to refer to either the temperature sensor or the thermocouple. In one embodiment, the second controlling unit 614 is a digital controlling unit. In one specific embodiment, the second controlling unit 614 and the first controlling unit 106 are integrated.

The thermocouple 602 is configured to produce a voltage signal as a result of a thermoelectric effect. The voltage signal is representative of the measured temperature. The thermocouple 602 is operatively coupled to the one or more first controllable switch of the converter 102 and the comparator 604. The comparator 604, a resistor coupled to the comparator 604, and a Zener diode 609 forms an analog circuit 612.

In the illustrated embodiment, the thermocouple 602 is configured to generate a first voltage representative of the temperature of the first controllable switch. In one embodiment, the comparator 604 is a hysteresis comparator. The comparator 604 includes an inverting input terminal 608 and a non-inverting input terminal 606. A reference voltage $V_{ref}$ is generated at the inverting input terminal 608, using the Zener diode 609. The reference voltage $V_{ref}$ is representative of the transition temperature and may also be referred to as a second voltage.

The first voltage is transmitted to the non-inverting input terminal 606. In one embodiment, the first voltage generated using the thermocouple 602 may be a substantially low value and hence may not be detectable at the non-inverting input terminal 606 of the comparator 604. In such an embodiment, an amplifier is used at an output of the thermocouple 602 in order to amplify the first voltage. Accordingly, an amplified value of first voltage is obtained.

In the illustrated embodiment, the first voltage is compared with the second voltage, using the comparator 604. In particular, the amplified value of first voltage is compared with the second voltage. The analog circuit 612 generates a first control signal 613 for controlling the first controllable switch based on the comparison of the first voltage with the second voltage. The first control signal 613 may be a high signal or a low signal.

At any instant, if the operating temperature of the first controllable switch is greater than the transition temperature, then the first voltage transmitted to the non-inverting input terminal 606 is greater than the reference voltage $V_{ref}$ (second voltage) transmitted to the inverting input terminal 608. The analog circuit 612 generates a high signal at an output terminal 610 of the comparator 604. If the high signal is transmitted to the control circuit 616, the first controllable switch is disabled.

In an alternative embodiment, the second controlling unit 614 is configured to directly acquire the temperature of the first controllable switch from the thermocouple 602. In particular, the second temperature determination subunit 620 is configured to directly acquire the temperature of the first controllable switch from the thermocouple 602. The determined temperature is transmitted to an analog to digital converter and a digital value corresponding to the determined temperature is obtained. Furthermore, the second controlling unit 614 is configured to generate a second control signal 618 based on the determined temperature. In particular, the second switching subunit 624 is configured to generate the second control signal 618 based on the determined temperature. More particularly, the second controlling unit 614 is configured to generate the second control signal 618 based on the digital value of determined temperature. If the temperature of the first controllable switch is less than the transition temperature, then the generated second control signal 618 is a low signal. Accordingly, the first controllable switch is activated based on the generated second control signal 618.

Furthermore, the second controlling unit 614 is configured to determine a value of variation of a parameter of the one or more components of the sensing unit. In particular, the second comparison subunit 622 is configured to determine a value of variation of a parameter of the one or more components of the sensing unit. In one embodiment, the parameter may be a resistance of the amplifier used at an output of the thermocouple 602.

The analog circuit 612 includes resistors, comparators, Zener diodes, and the like. Hence, the analog circuit 612 is prone to issues associated with failure. In certain scenarios the determination of temperature using the analog circuit 612 may be erroneous. Therefore, the first control signal 613 generated by the analog circuit 612 need to be further analyzed by the second controlling unit 614 to avoid any generation of errors. In one such embodiment, the sensing unit 601 is configured to transmit the first control signal 613 to the second controlling unit 614 for further analysis.

Subsequently, the second controlling unit 614, in particular, the second comparison subunit 622 is configured to compare the second control signal 618 with the first control signal 613 based on the value of variation of the parameter of the one or more components of the sensing unit. In one embodiment, the variation of the parameter may be a variation in resistance of the amplifier used at the output of the thermocouple. In such an embodiment, the variation in resistance may in turn cause a change in gain of the amplifier. In one embodiment, if the first control signal 613 is a high signal and the second control signal 618 is a low signal, then the comparison of both the first and the second control signal 613, 618 enables to identify that the first control signal 613 is different from the second control signal 618.

The second controlling unit 614, in particular, the second switching subunit 624, is further configured to control the switching state of the one or more first controllable switches based on comparison of the second control signal 618 with the first control signal 613. As noted hereinabove, the analog circuit 612 is prone to failure. Hence, in one embodiment, the second switching subunit 624 is configured to prioritize the second control signal 618 over the first control signal 613, when the first control signal 613 is different from the second control signal 618. In another embodiment, the second switching subunit 624 may prioritize the second control signal 618 over the first control signal 613 based on the value of variation of the parameter of the one or more components of the sensing unit. Accordingly, a determination is made to transmit the second control signal 618 to the control circuit 616. As a result, the first controllable switch is activated.

The activation/deactivation of the first controllable switch is performed based on the determination of operating temperature of the first controllable switch. Although in the illustrated embodiment, a thermocouple is used, in other embodiments, other types of temperature sensors are envisioned.

Figure 7:
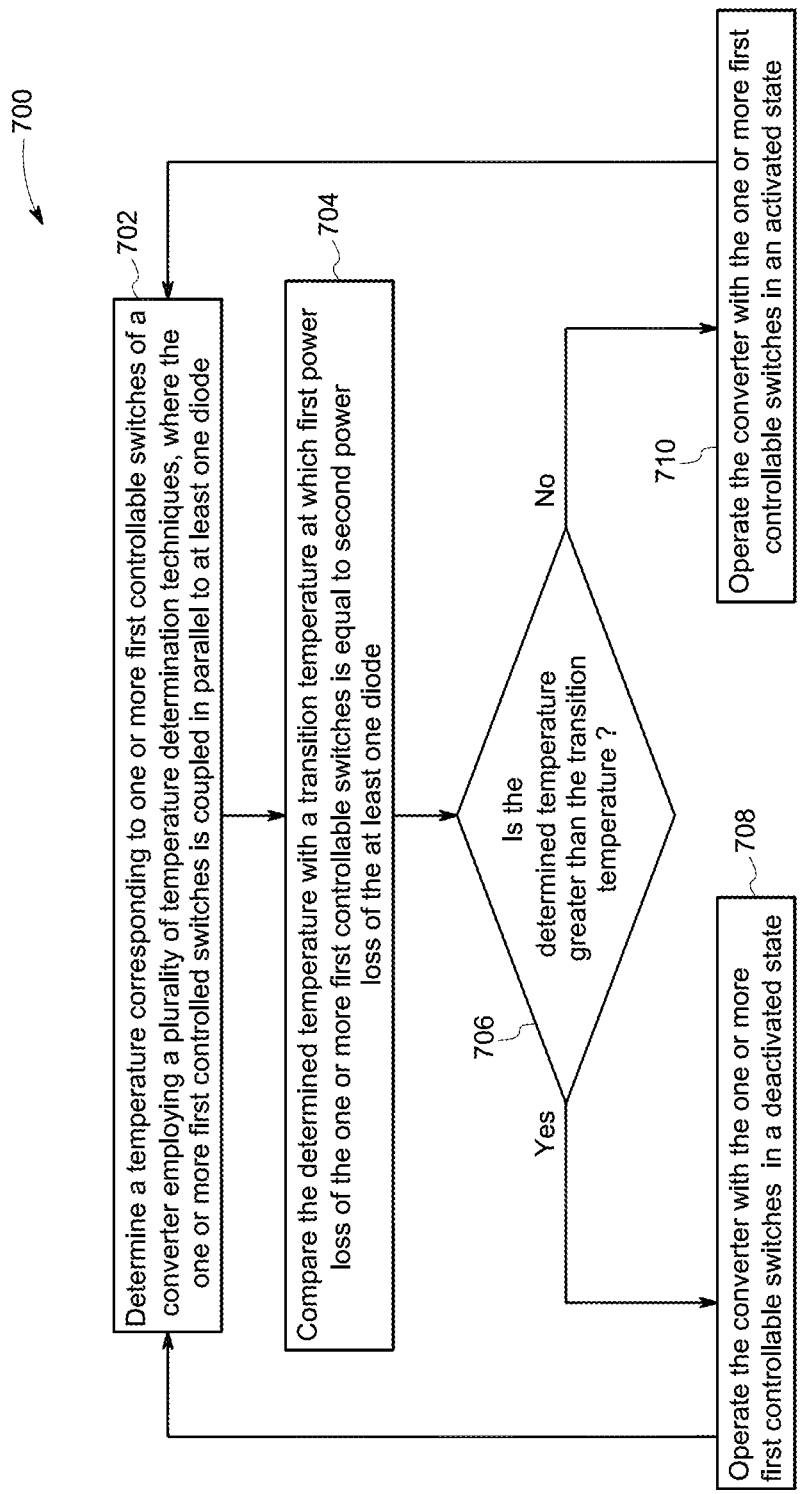
FIG. 7 is a flow chart illustrating an exemplary method for operation of a power conversion system in accordance with certain embodiments of the present invention.

FIG. 7 is a flow chart 700 illustrating an exemplary method for operation of a power conversion system in accordance with certain embodiments of the present invention. At step 702, a temperature of one or more first controllable switches is determined using a temperature determination technique.

In one embodiment, the temperature determination technique may include determining a filter current of the filtering circuit. Further, a magnitude of a switching harmonic component is determined based on the determined filter current. In one embodiment, the magnitude of switching harmonic component is determined by conducting a Fast Fourier Transform (FFT) of the determined filter current. The temperature of the one or more first controllable switches is determined based on the magnitude of the switching harmonic component. In particular, the temperature of the one or more first controllable switches is determined based on the magnitude of the switching harmonic component, using a harmonic component look-up table. The harmonic component look-up table is stored in a data repository operatively coupled to the first controlling unit.

In one embodiment, the harmonic component look up table may include a plurality of sub-look-up tables, where each sub-look-up table corresponds to different ambient temperatures. The sub-look-up table may be representative of a relation between different switching harmonic component magnitudes and different values of junction temperature for a predefined ambient temperature.

In another embodiment, the temperature determination technique may include determining a load current. Further, a current transmitted through the one or more first controllable switches is determined based on the determined load current. A temperature of the one or more first controllable switches is determined based on the current transmitted through the one or more first controllable switches.

The temperature of the one or more first controllable switches is representative of a junction temperature of the one or more first controllable switches. In one embodiment, the temperature of the one or more first controllable switches is determined using a first monotonic function related to the load current and a temperature of the one or more first controllable switches. One example of the first monotonic function is represented below in equation (1).

$$T_j = T_a + R_{ja}\left[(I^2 * R_{ds,on} * k) + \left(\frac{V * I * f_{sw}}{6} * (T_{ON} + T_{OFF})\right)\right], \quad (1)$$

where $T_j$=temperature of the one or more first controllable switches;
$T_a$=ambient temperature;
$R_{ja}$=junction to ambient thermal resistance;
k=constant of proportionality relating ON state current and root mean square (RMS) current through one or more first controllable switches;
I=ON state current of the one or more first controllable switches;
V=OFF state voltage of the one or more first controllable switches;
$f_{sw}$=switching frequency;
$T_{ON}$=ON time of the one or more first controllable switches; and
$T_{OFF}$=OFF time of the one or more first controllable switches.

In yet another second controllable switch. In one embodiment, the temperature of the one or more first controllable switches may be determined using a second monotonic function related to a temperature of the one or more first controllable switches and the modulation signal/duty cycle of the second controllable switch. One example of the second monotonic function is represented below in equation (2).

$$T_j = T_a + R_{ja}\left[\left(\frac{D * V_{in} - V_o}{R_{filt}} * T_{on} * f_{sw} * R_{ds,on}\right) + \left(\sqrt{\frac{D * V_{in} - V_o}{R_{filt}} * T_{on} * f_{sw}} * \frac{V * c * f_{sw}}{6} * (T_{ON} + T_{OFF})\right)\right] \quad (2)$$

where $T_j$=temperature of the one or more first controllable switches;
$T_a$=ambient temperature;
$R_{ja}$=junction to ambient thermal resistance;
D=Duty cycle of the second controllable switch;
$V_{in}$=Input voltage of a converter
$V_o$=Output voltage of a converter
$R_{filt}$=Inductive filter resistance
c=constant of proportionality
I=ON state current of the one or more first controllable switches;
V=OFF state voltage of the one or more first controllable switches;
$f_{sw}$=switching frequency;
$T_{ON}$=ON time of the one or more first controllable switches; and
$T_{OFF}$=OFF time of the one or more first controllable switches.

In one embodiment, a Boolean operation may be performed on all results obtained from the abovementioned temperature determination techniques by the first controlling unit for determining a switching state of the one or more first controllable switches such as to avoid any damage to the one or more first controllable switch. In particular, the Boolean operation may be performed on all results obtained from the abovementioned temperature determination techniques by the first comparison subunit of the first controlling unit.

In some embodiments, if the first switch includes a plurality of first controllable switches, the temperature of each first controllable switch is determined using the abovementioned temperature determination techniques. Accordingly, a determined temperature is a maximum of the plurality of acquired values of temperature. In another embodiment, the determined temperature is an average of the plurality of acquired values of temperature.

Furthermore, at step 704, the determined temperature is compared with a transition temperature. At step 706, a check is done to identify if the determined temperature is greater than the transition temperature. If the determined temperature is greater than the transition temperature the control may be transferred to step 708, else the control may be transferred to step 710. At step 708, the one or more first controllable switches of the converter are transitioned to a de-activated state. When the one or more first controllable switches are in a de-activated state, the one or more diodes parallel to the one or more first controllable switches provides a conducting path. Subsequent to step 708, the control may be shifted back to step 702 and again the steps 702, 704, 706, and 708 or 710 may be repeated.

Further, at step 710, the one or more first controllable switches of the converter are transitioned to an activated state. Subsequent to step 710, the control may be shifted back to step 702 and the steps 702, 704, 706, and 708 or 710 may be repeated.

Steps 708, 710 allude to controlling a switching state of the one or more first controllable switch based on the comparison of the determined temperature with the transition temperature. In particular, steps 708 and 710 allude to deactivation and activation of the one or more first controllable switches. In some embodiments, the activation refers to activation of a plurality of first controllable switches. In another embodiment, the activation refers to activation of a subset of the plurality of first controllable switches. In such a scenario, the remaining subset of the plurality of first controllable switches is maintained in a deactivated state.

The exemplary process steps may be implemented by suitable codes on a processor-based system, such as a general-purpose or special-purpose computer. Some or all of the steps described herein may be performed in different order or substantially concurrently. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may include paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

In accordance with the exemplary embodiments discussed herein, the power conversion system includes a converter having switches that can be operated over a wide range of temperatures, without compromising on the efficiency of the power conversion system. The use of such switches in the power conversion system minimizes the need of advanced thermal management solutions and over-rating of the converters.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A system comprising:
a converter comprising a first switch comprising one or more first controllable switches coupled in parallel across at least one diode;
a first controlling unit operatively coupled to the converter, configured to:
determine a temperature of the one or more first controllable switches;
compare the determined temperature of the one or more first controllable switches with a transition temperature at which a first power loss of the one or more first controllable switches is equal to a second power loss of the at least one diode; and
control a switching state of the one or more first controllable switches based on the comparison of the determined temperature with the transition temperature;
a sensing unit operatively coupled to the converter comprising:
a temperature sensor operatively coupled to the one or more first controllable switches, and
a comparator operatively coupled to the temperature sensor;
a second controlling unit operatively coupled to the sensing unit,
wherein the sensing unit is configured to:
determine, using the temperature sensor, a first voltage representative of the temperature of the one or more first controllable switches;
compare, using the comparator, the determined first voltage with a second voltage representative of the transition temperature;
generate a first control signal for controlling the one or more first controllable switches based on the comparison of the determined first voltage with the second voltage,
transmit the first control signal to the second controlling unit; and
wherein the second controlling unit is configured to:
determine, using the temperature sensor, the temperature of the one or more first controllable switches, and
generate a second control signal based on the determined temperature.

2. The system of claim 1, wherein the one or more first controllable switches comprise at least one of a silicon based switch and a wide-band gap device.

3. The system of claim 1, wherein the converter further comprises a second switch.

4. The system of claim 1, wherein the first switch comprises a freewheeling body diode coupled in parallel to each of the one or more first controllable switches.

5. The system of claim 4, wherein a forward voltage drop of the at least one diode is substantially less than a forward voltage drop of the freewheeling body diode.

6. The system of claim 1, wherein the second controlling unit is further configured to:
determine a value of variation of one or more parameters of one or more components of the sensing unit;
compare the second control signal with the first control signal based on the value of variation of the one or more parameters; and
control the switching state of the one or more first controllable switches based on the comparison of the second control signal with the first control signal.

7. A method comprising:
determining a temperature of one or more first controllable switches of a converter, wherein the one or more first controllable switches is coupled in parallel across at least one diode of the converter;
comparing the determined temperature of the one or more first controllable switches with a transition temperature at which a first power loss of the one or more first controllable switches is equal to a second power loss of the at least one diode; and
controlling a switching state of the one or more first controllable switches based on the comparison of the determined temperature with the transition temperature;
determining a first voltage representative of the temperature of the one or more first controllable switches, using a temperature sensor of a sensing unit;
comparing the determined first voltage with a second voltage representative of the transition temperature, using a comparator of the sensing unit; and
generating a first control signal for controlling the one or more first controllable switches based on the comparison of the determined first voltage with the second voltage;
determining the temperature of the one or more first controllable switches, using a second controlling unit operatively coupled to the sensing unit; and
generating a second control signal based on the determined temperature, using the second controlling unit.

8. The method of claim 7, wherein the temperature of the one or more first controllable switches is representative of a junction temperature of the one or more first controllable switches.

9. The method of claim 7, further comprising:
determining, using the second controlling unit, a value of variation of one or more parameters of one or more components of the sensing unit;
comparing, using the second controlling unit, the second control signal with the first control signal based on the value of variation of the one or more parameters; and
controlling the switching state of the one or more first controllable switches based on the comparison of the second control signal with the first control signal.

10. The method of claim 7, wherein determining the temperature of the one or more first controllable switches comprises determining a load current.

11. The method of claim 10, wherein determining the temperature of the one or more first controllable switches further comprises:
determining a current transmitted through the one or more first controllable switches based on the determined load current; and
determining the temperature of the one or more first controllable switches based on the current transmitted through the one or more first controllable switches.

12. The method of claim 10, wherein determining the temperature of the one or more first controllable switches further comprises:
determining a duty cycle of a second switch of the converter based on the determined load current; and
determining the temperature of the one or more first controllable switches based on the duty cycle of the second switch.

13. The method of claim 7, wherein determining the temperature of the one or more first controllable switches comprises:
determining a filter current of a filtering circuit coupled to the converter;
determining a magnitude of a switching harmonic component based on the determined filter current; and
determining the temperature of the one or more first controllable switches based on the determined magnitude of the switching harmonic component.

14. The method of claim 7, wherein controlling the switching state of the one or more first controllable switches comprises operating the converter with the one or more first controllable switches in a de-activated state if the determined temperature is greater than the transition temperature.

15. The method of claim 7, wherein controlling the switching state of the one or more first controllable switches comprises operating the converter with the one or more first controllable switches in an activated state if the determined temperature is less than the transition temperature.

16. The method of claim 7, wherein the determined temperature of the one or more first controllable switches comprises at least one of a maximum temperature and an average temperature of the one or more first controllable switches.

* * * * *